US007101304B2

(12) United States Patent
Swanson et al.

(10) Patent No.: US 7,101,304 B2
(45) Date of Patent: Sep. 5, 2006

(54) ELECTRIC SHIFT TRANSFER CASE

(75) Inventors: Jeffrey Swanson, Clay, NY (US); Carl H. Vonnegut, Newton, MA (US)

(73) Assignee: Magna Powertrain USA, Inc., Troy, MI (US)

( * ) Notice: Subject to any disclaimer, the term of this patent is extended or adjusted under 35 U.S.C. 154(b) by 144 days.

(21) Appl. No.: 10/949,410

(22) Filed: Sep. 24, 2004

(65) Prior Publication Data

US 2006/0065067 A1 Mar. 30, 2006

(51) Int. Cl.
*F16H 3/44* (2006.01)

(52) U.S. Cl. ...................... 475/295; 475/303; 180/247; 180/248; 180/249; 192/69.91; 192/84.6; 192/89.29

(58) Field of Classification Search .................. 74/335; 475/303, 295, 249; 180/233, 247, 248, 249, 180/250; 192/69.91, 84.6, 89.29
See application file for complete search history.

(56) References Cited

U.S. PATENT DOCUMENTS 2,644,550 A * 7/1953 Flinn .......................... 188/163
4,462,271 A * 7/1984 Stieg ........................... 475/86
4,529,080 A 7/1985 Dolan
4,770,280 A 9/1988 Frost
5,193,410 A * 3/1993 Stine et al. ............... 74/336 R
5,460,060 A 10/1995 Nellums
5,517,876 A 5/1996 Genise et al.
5,702,321 A * 12/1997 Bakowski et al. .......... 475/199
5,832,777 A 11/1998 Weilant
5,878,624 A 3/1999 Showalter et al.
5,951,429 A 9/1999 Eastman
7,004,875 B1 * 2/2006 Williams et al. ............ 475/198
2004/0069082 A1 * 4/2004 Koenig et al. ................ 74/335

* cited by examiner

*Primary Examiner*—Charles A. Marmor
*Assistant Examiner*—David D. Le
(74) *Attorney, Agent, or Firm*—Harness, Dickey & Pierce, P.L.C.

(57) ABSTRACT

The present invention provides a shift mechanism disposed in a housing for providing operable communication between a shift actuator and a shift sleeve. The shift mechanism generally includes a shift rail, a shift fork, a first biasing member, and a second biasing member. The shift rail is slidably supported by the housing. The shift fork is slidably disposed on the shift rail and engages the shift sleeve. The first biasing member is disposed between the shift actuator and the shift rail for selectively biasing the shift rail in a first direction upon actuation of the shift actuator. The second biasing member is disposed between the housing and the shift fork for biasing the shift fork in a second direction that is substantially opposite the first direction.

17 Claims, 4 Drawing Sheets

ELECTRIC SHIFT TRANSFER CASE

FIELD OF THE INVENTION

The present invention relates to shift systems for power transfer systems and, more particularly, to an electric shift system for use in a four-wheel drive transfer case.

BACKGROUND OF THE INVENTION

It is known in the automobile industry to equip power transfer systems (e.g., manual transmissions, transfer cases and the like) with a shift system having spring loaded shift devices for completing a delayed or blocked gear or mode shift once speed synchronization or a torque break occurs. Examples of conventional spring-loaded shift systems are disclosed in U.S. Pat. Nos. 4,529,080, 4,770,280, 5,460,060 and 5,517,876. In each of these patents, a pair of springs are used to provide a bi-directional preload function for effectuating coupling of a dog-type clutch sleeve with a desired gear set. While such arrangements are satisfactory for their intended purpose, a need exists to develop simpler, more cost effective alternatives that provide the desired function while advancing the art.

SUMMARY OF THE INVENTION

Accordingly, the present invention provides a shift mechanism disposed in a housing for providing operable communication between a shift actuator and a clutch sleeve. The shift mechanism generally includes a shift rail, a shift fork, a first biasing member, and a second biasing member. The shift rail is slidably supported by the housing. The shift fork is slidably disposed on the shift rail and engages the clutch sleeve. The first biasing member is disposed between the shift actuator and the shift rail for selectively biasing the shift rail in a first direction upon actuation of the shift actuator. The second biasing member is disposed between the housing and the shift fork for biasing the shift fork in a second direction that is substantially opposite the first direction.

Another aspect of the present invention provides a transfer case generally including a housing, an input shaft, a first output shaft, a second output shaft, a gearset, a mode sleeve, a shift actuator, and a shift mechanism. The input shaft, first output shaft and second output shaft are rotatably supported by the housing. The gearset is driven by the input shaft and includes a first rotary output driving the first output shaft and a second rotary output driving the second output shaft. The mode sleeve is moveable for selectively coupling the first output shaft to the second output shaft. The shift actuator is in operable communication with the mode sleeve for initiating the selective coupling. The shift mechanism is disposed between the shift actuator and the mode sleeve for providing the operable communication therebetween. The shift mechanism generally includes a shift rail, a shift fork, a first biasing member, and a second biasing member. The shift rail is slidably supported by the housing. The shift fork is slidably supported on the shift rail and is in operable communication with the mode sleeve. The first biasing member is disposed within the shift actuator and the shift rail for selectively biasing the shift rail in a first direction in response to the shift actuator being actuated. The second biasing member is disposed between the housing and the range fork for biasing the shift fork in a second direction that is substantially opposite to the first direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

In general, the present invention is directed to a shift system of the type used in motor vehicle power transmission devices for effectuating translational movement of a coupling member to shift between gear ratios or drive modes.

Figure 1:
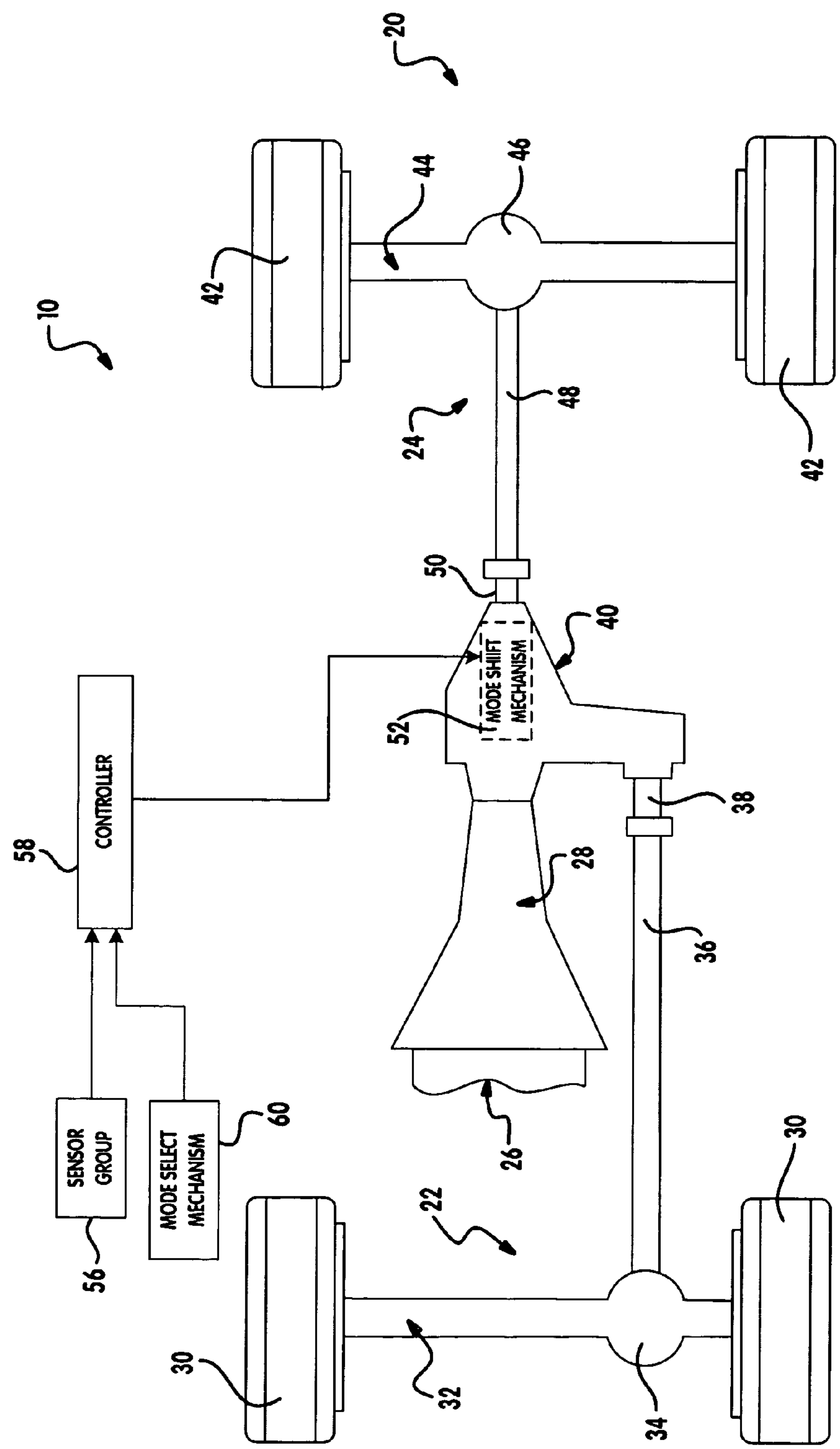
FIG. 1 is a schematic illustration of a vehicle equipped with an electric shift transfer case.

FIG. 1 depicts a four-wheel drive vehicle 10 generally including a front driveline 22, a rear driveline 24, and a power source, such as an engine 26 (partially shown). Engine 26 provides rotary power (i.e., drive torque) to the front and rear drivelines 22, 24 via a transmission 28. Transmission 28 may be either a manual or automatic shifting transmission. Front driveline 22 includes a pair of front wheels 30 connected to opposite ends of a front axle assembly 32 having a front differential 34. Front differential 34 is coupled to one end of a front prop shaft 36, the opposite end of which is coupled to a front output shaft 38 of a transfer case 40. Similarly, rear driveline 24 includes a pair of rear wheels 42 connected to opposite ends of a rear axle assembly 44 having a rear differential 46. Rear differential 46 is coupled to one end of a rear prop shaft 48, the opposite end of which is coupled to a rear output shaft 50 of transfer case 40. Transfer case 40 is equipped with a mode shift mechanism 52 that is operable to control a mode of operation of transfer case 40. Actuation of mode shift mechanism 52 is controlled by a controller 58. Controller 58 generates control signals and responds to a passenger operating a mode select mechanism 60 within the passenger compartment of vehicle 10.

Figure 2:
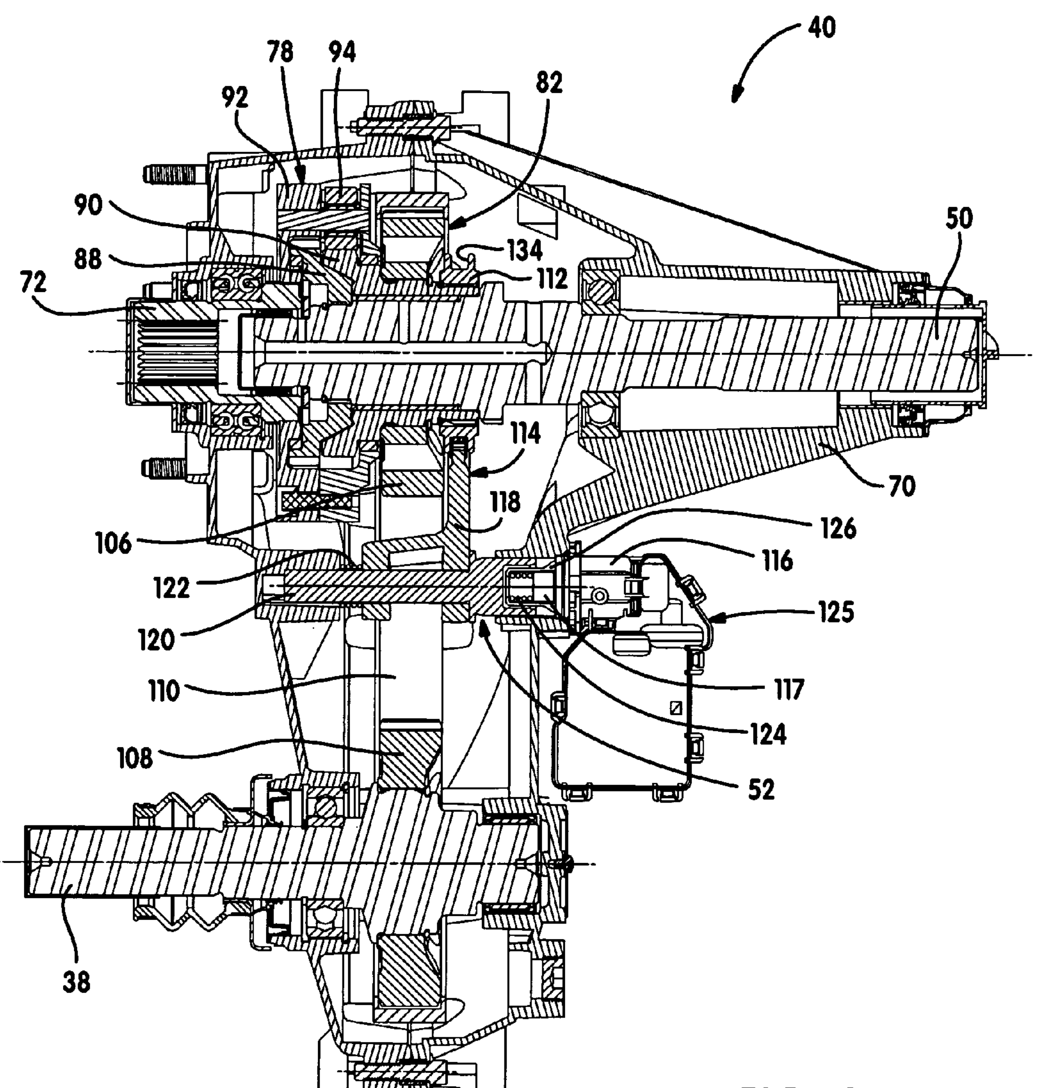
FIG. 2 is a cross-sectional view of an exemplary electric shift transfer case according to the present invention.

FIG. 2 depicts an exemplary construction for transfer case 40 which is shown to include a housing 70, an input shaft 72 rotatably supported from housing 70, rear output shaft 50 rotatably supported between input shaft 72 and housing 70, front output shaft 38 rotatably supported from housing 70, a differential gearset 78 driven by input shaft 72, a transfer mechanism 82 driving front output shaft 38, and mode shift mechanism 52 for selectively shifting differential 78 between operation in either of a first or "open" drive mode or a second or "locked" drive mode.

Differential 78 includes a first sun gear 88, a second sun gear 90, a carrier 92, and meshed sets of planetary gears 94. Carrier 92 is driven by input shaft 72. The meshed sets of planetary gears 94 are rotatably supported on pins on carrier 92 and include a plurality of first plant gears meshed with first sun gear 88 and a plurality of second plant gears meshed with second sun gears 90. As seen, first sun gear 88 is drivingly coupled to rear output shaft 50 while second sun gear 90 is rotatably supported on rear output shaft 50 and drivingly coupled to transfer mechanism 82.

Transfer mechanism 82 is shown to include a first sprocket 106 fixed to second sun gear 90, a second sprocket 108 fixed to front output shaft 38, and a power chain 110 connecting first sprocket 106 to second sprocket 108. Mode shift mechanism 52 includes a mode sleeve 112, a shift fork assembly 114, and an actuator assembly 116. Mode sleeve 112 is splined to second sun gear 90 for axial displacement thereon between a first mode position (shown in FIGS. 2 and 3A) and a second mode position (shown in FIG. 3B). The first mode position provides for an open differential, wherein rear output shaft 50 and front output shaft 38 are permitted to have different rotational velocities. The second mode position provides for a locked differential, wherein rear output shaft 50 and front output shaft 38 rotate at a common rotational velocity. To manipulate mode sleeve 112 between its first and second mode positions, actuator assembly 116 is actuated via mode select mechanism 60 to move shift fork assembly 114 and, therefore, mode sleeve 112.

Shift fork assembly 114 includes a shift fork 118, a shift rail 120, a return spring 122, an actuator spring 124, and a plunger 126. Actuator assembly 116 includes a linear actuator 125 having a bi-directionally displaceable member 117. In an exemplary embodiment, linear actuator 125 includes an electric motor operable for linearly driving a ball screw mechanism. An exemplary ball screw mechanism is described in commonly owned U.S. Pat. No. 6,725,990, the disclosure of which is hereby incorporated by reference. However, it should be appreciated that alternative linear actuators are intended to be within the scope of the present invention.

Figure 3A:
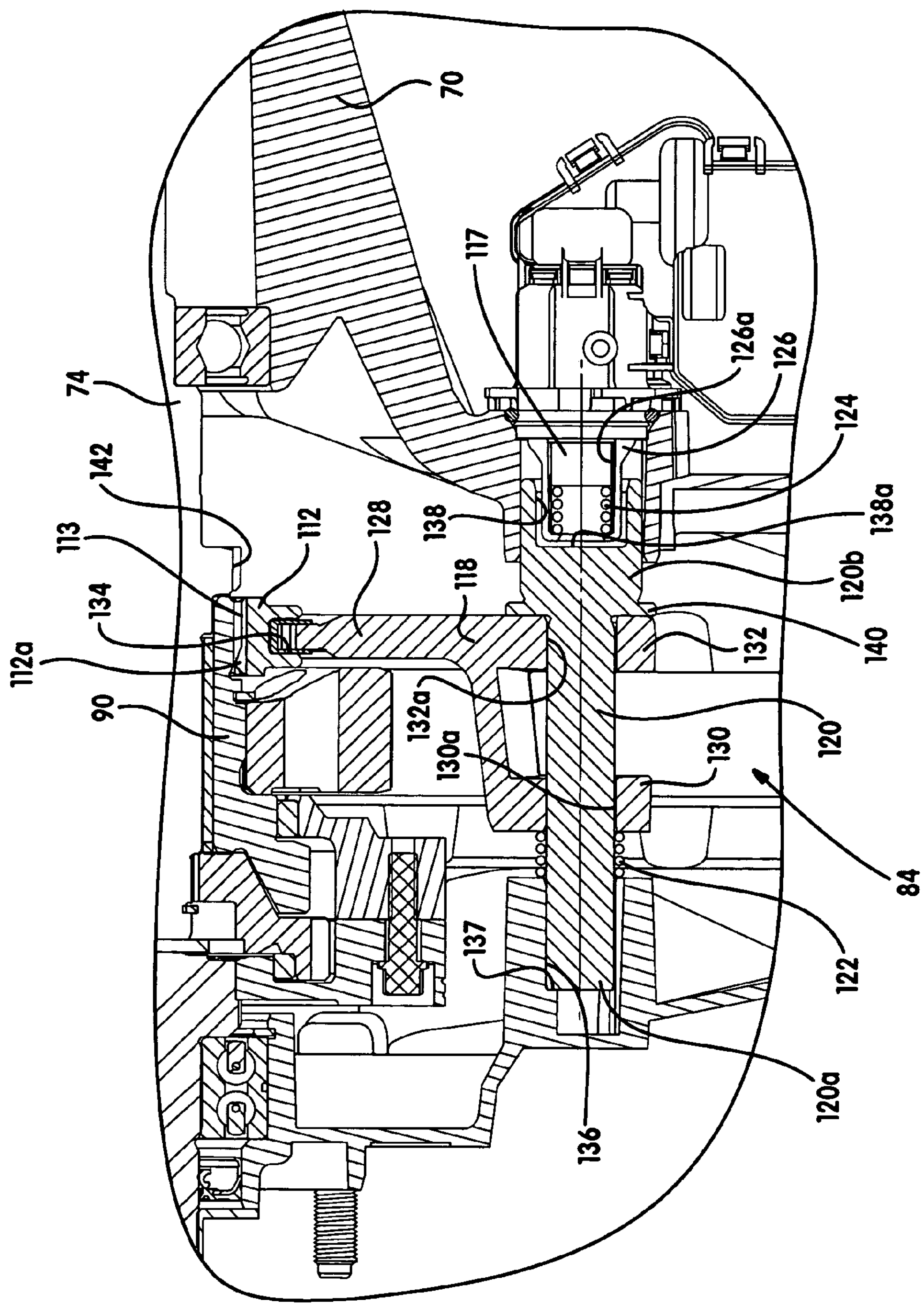
FIG. 3A is a cross-sectional detail view of a mode shift system associated with the transfer case of FIG. 2 operably located in a first mode position.
Figure 3B:
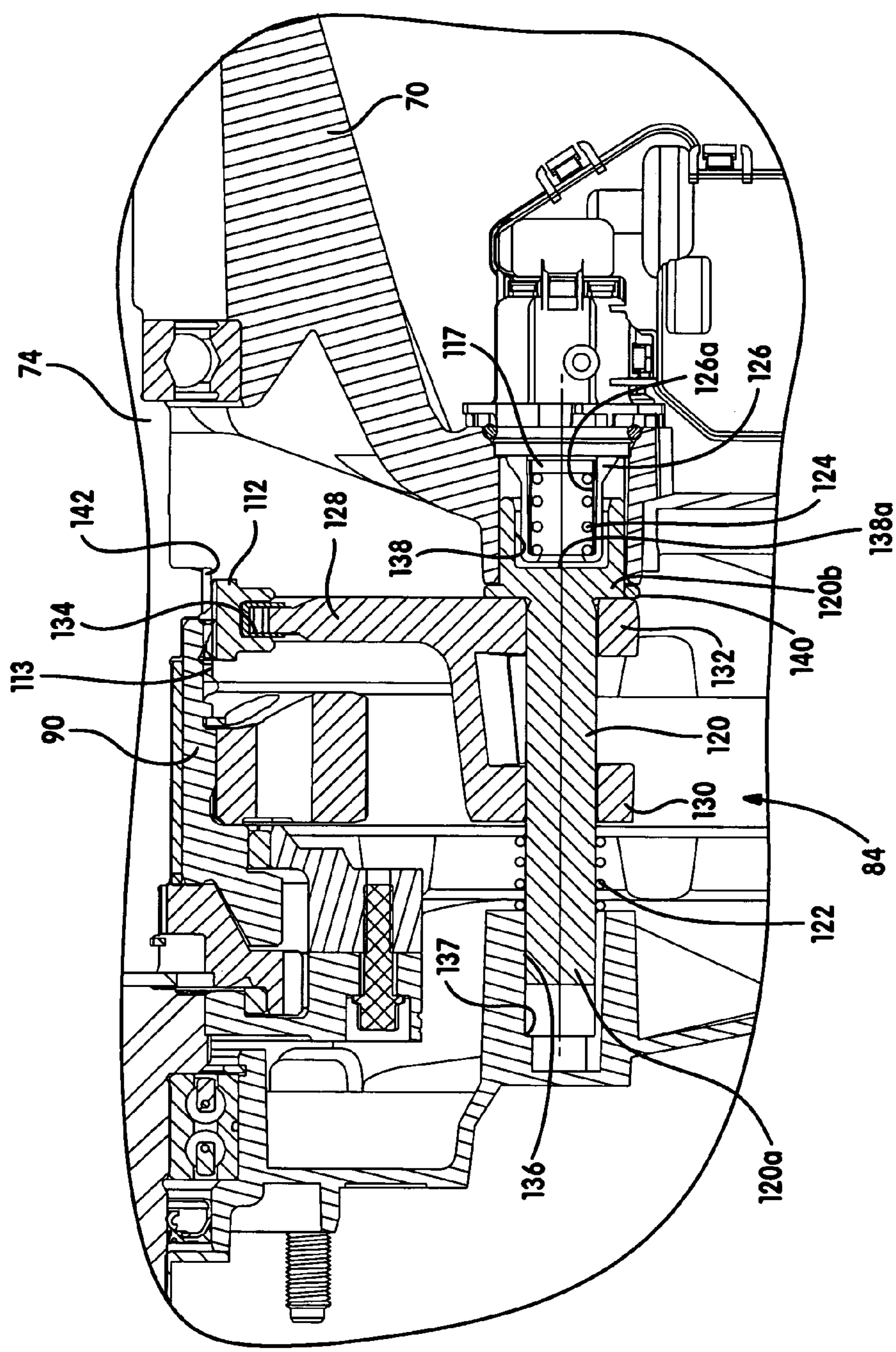
FIG. 3B is a cross-sectional detail view of the mode shift system shown operably located in a second mode position.

FIGS. 3A and 3B depict shift fork 118 including an arm 128, a first finger 130 and a second finger 132. An end section of arm 128 is slidably disposed in an annular channel 134 formed in mode sleeve 112. First and second fingers 130 and 132 include coaxial apertures 130*a* and 132*a* that are slidably disposed on shift rail 120. Shift rail 120 includes a first end 120*a* and a second end 120*b*. First end 120*a* is rotatably supported in a blind bore 136 formed in housing 70 of transfer case 40. Blind bore 136 includes a shoulder 137 formed therein. Return spring 122 is disposed on first end 120*a* of shift rail 120 between housing 70 and first finger 130 of shift fork 118. Second end 120*b* of shift rail 120 includes a blind bore 138 and an annular flange 140. Blind bore 138 of shift rail 120 receives plunger 126. Plunger 126 includes a cup-shaped member having an opening 126*a* containing actuator spring 124 and which is adapted to selectively receive displaceable member 117 of actuator assembly 116.

As stated above, FIG. 3A shows mode shift mechanism 52 in its first mode position. Displaceable member 117 of actuator assembly 116 is extended into opening 126*a* of plunger 126, thereby compressing actuator spring 124. This causes plunger 126 to be biased toward shift rail 120. Plunger 126 engages an end surface 138*a* of blind bore 138 in second end 120*b* of shift rail 120, thereby biasing shift rail 120 to the left, relative to the view illustrated. Annular flange 140 thereby engages second finger 132 of shift fork 118 which, in turn, causes first finger 130 of shift fork 118 to compress return spring 122 against housing 70. In this position, arm 128 positions internal spline teeth 112*a* on mode sleeve 112 in absolute engagement with only clutch teeth 113 of second sun gear 90. Furthermore, it should be noted that in the first mode position illustrated, first end 120*a* of shift rail 120 bottoms out and engages shoulder 137 in blind bore 136 of housing 70. Shoulder 137 therefore provides the necessary reaction force for actuation spring 124 to continue biasing mode shift mechanism 52 into this first mode position.

FIG. 3B illustrates mode shift mechanism 52 in its second mode position wherein mode sleeve 112 locks second sun gear 90 to rear output shaft 50. To move mode sleeve 112 from its first mode position to its second mode position, actuator assembly 116 retracts displaceable member 117 from actuator spring 124 in opening 126*a* of plunger 126. This enables return spring 122 to decompress, thereby forcing shift fork 118 to the right, relative to the view illustrated. When shift fork 118 travels to the right, arm 128 applies an axial force to annular channel 134 on mode sleeve 112. This causes spline teeth 112*a* on mode sleeve 112 to slide into simultaneous locking engagement with clutch teeth 142 on rear output shaft 50 and clutch teeth 113 on second sun gear 90. To return mode sleeve 112 to its first mode position, actuator 116 is actuated such that displaceable member 117 extends into opening 126*a* of plunger 126. Upon actuation of displaceable member 117, annular flange 140 on shift rail 120 engages second finger 132 of range fork 118 and overcomes the bias provided by return spring 122. Shift fork 118 is thereby forced to the left, relative to the views illustrated. This, in turn, moves mode sleeve 112 out of meshed engagement with clutch teeth 142 on rear output shaft 50.

It should be appreciated that return and actuation springs 122, 124 provide a biased mode shift mechanism 52. Specifically, return spring 122 continuously biases shift fork 118 toward its second mode position illustrated in FIG. 3B. Therefore, once actuator 116 retracts displaceable member 117 from actuator spring 124, return spring 122 forces shift fork 118 to the right, which in turn forces shift rail 120 to the right. This continuous bias is beneficial in a blocking event, wherein mode sleeve 112 is initially blocked from sliding into meshed engagement with clutch teeth 142 of rear output shaft 50. Additionally, when actuator 116 is actuated, actuator spring 124 biases plunger 126 and, therefore, shift rail 120 toward the first position. Once actuator 116 extends displaceable member 117 to compress actuator spring 124, plunger 126 applies an axial force to shift rail 120. This is beneficial in a blocking event, wherein mode sleeve 112 is initially blocked from disengaging clutch teeth 142 of rear output shaft 50. Therefore, it should be appreciated that transfer case 40 of the present invention provides a simplistic, sensor free, mode shift mechanism capable of overcoming delayed or blocked shift events.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shift mechanism disposed in a housing for providing operable communication between a shift actuator and a shift sleeve, comprising:

a shift rail slidably supported by the housing;

a shift fork slidably disposed on said shift rail and engaging the shift sleeve;

a first biasing member disposed within the shift actuator and a first end of said shift rail for selectively biasing said shift rail in a first direction upon actuation of the shift actuator;

a second biasing member disposed on said shift rail opposite said shift fork from said first end and between said housing and said shift fork for biasing said shift fork in a second direction that is substantially opposite said first direction; and an axially moveable plunger disposed at said first end of said shift rail, said plunger engaging said shift rail and driving said shift rail in said first direction upon actuation of the shift actuator.

2. The shift mechanism of claim 1 wherein said second biasing member includes a coil spring.

3. The shift mechanism of claim 1 wherein said first biasing member includes a coil spring disposed within the actuator for biasing said plunger into said shift rail upon actuation of the shift actuator.

4. The shift mechanism of claim 1 wherein said shift rail includes a shoulder for selectively engaging said shift fork and driving said shift fork in said first direction.

5. A transfer case, comprising:

a housing;

an input shaft rotatably supported by said housing;

a first output shaft rotatably supported by said housing;

a second output shaft rotatably supported by said housing;

a compound planetary gearset driven by said input shaft and having a first sun gear driving said first output shaft and a second sun gear driving said second output shaft;

a shift sleeve for selectively coupling said first and second output shafts;

a linear shift actuator in operable communication with said shift sleeve for initiating said selective coupling;

a shift mechanism for providing said operable communication, said shift mechanism including:

a shift rail slidably supported by said housing;

a shift fork slidably supported on said shift rail and operably communicating with said shift sleeve;

a first biasing member disposed between said linear shift actuator and a first end of said shift rail for selectively biasing said shift rail in a first direction in response to said linear shift actuator being actuated; and a second biasing member disposed on said shift rail opposite said shift fork from said first end and between said housing and said shift fork for biasing said shift fork in a second direction that is substantially opposite to said first direction.

6. The transfer case of claim 5 wherein said shift rail includes a shoulder for selectively engaging said shift fork and driving said shift fork in said first direction.

7. The transfer case of claim 5 wherein said second biasing member includes a coil spring.

8. The transfer case of claim 5 wherein said housing includes a throughbore slidably supporting said first end of said shift rail and a blind bore slidably supporting an opposite end.

9. The transfer case of claim 5 further comprising a plunger disposed at said first end of said shift rail for drivingly engaging said shift rail in said first direction upon actuation of said shift actuator.

10. The transfer case of claim 9 wherein said first biasing member includes a coil spring disposed within said linear shift actuator and said plunger for biasing said plunger into said shift rail upon actuation of said linear shift actuator.

11. A transfer case, comprising:

a housing;

an input shaft rotatably supported by said housing;

a first output shaft rotatably supported by said housing;

a second output shaft rotatably supported by said housing;

a gearset driven by said input shaft and having a first rotary output driving said first output shaft and a second rotary output driving said second output shaft;

a shift sleeve for selectively coupling said first and second output shafts;

a linear shift actuator in operable communication with said shift sleeve for initiating said selective coupling;

a shift mechanism for providing said operable communication, said shift mechanism including:

a shift rail slidably supported by said housing;

a shift fork slidably supported on said shift rail and operably communicating with said shift sleeve;

a first biasing member disposed between said linear shift actuator and a first end of said shift rail for selectively biasing said shift rail in a first direction in response to said linear shift actuator being actuated;

a second biasing member disposed on said shift rail opposite said shift fork from said first end and between said housing and said shift fork for biasing said shift fork in a second direction that is substantially opposite to said first direction; and an axially moveable plunger disposed at said first end of said shift rail, said plunger engaging said shift rail and driving said shift rail in said first direction upon actuation of said shift actuator.

12. The shift mechanism of claim 11 wherein said gearset includes a compound planetary gearset having a carrier driven by said input shaft, said first rotary output being a first sun gear and said second rotary output being a second sun gear.

13. The shift mechanism of claim 11 wherein said first biasing member includes a coil spring disposed within the actuator for biasing said plunger into said shift rail upon actuation of the shift actuator.

14. The shift mechanism of claim 13 wherein said shift rail includes a shoulder for selectively engaging said shift fork and driving said shift fork in said first direction.

15. The shift mechanism of claim 14 wherein said second biasing member includes a coil spring.

16. The shift mechanism of claim 11 wherein said linear shift actuator includes an electric motor operable to linearly drive a ball screw mechanism.

17. The shift mechanism of claim 16 further including a bi-directionally displaceable member coupled to said linear shift actuator and in engagement with said first biasing member.

* * * * *